(12) United States Patent
Yura et al.

(10) Patent No.: US 8,367,205 B2
(45) Date of Patent: Feb. 5, 2013

(54) PLATE-LIKE POLYCRYSTALLINE PARTICLE

(75) Inventors: Yukinobu Yura, Nagoya (JP);
Nobuyuki Kobayashi, Nagoya (JP);
Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 358 days.

(21) Appl. No.: 12/395,749

(22) Filed: Mar. 2, 2009

(65) Prior Publication Data

US 2009/0239041 A1   Sep. 24, 2009

(30) Foreign Application Priority Data

Mar. 21, 2008   (JP) .................. 2008-074427
Jun. 10, 2008   (JP) .................. 2008-152099
Nov. 27, 2008   (JP) .................. 2008-303235

(51) Int. Cl.
*B32B 15/02*   (2006.01)
*C04B 33/00*   (2006.01)
*C04B 35/00*   (2006.01)

(52) U.S. Cl. ........ 428/402; 501/134; 501/135; 501/136; 252/62.9 PZ

(58) Field of Classification Search .................. None
See application file for complete search history.

(56) References Cited

U.S. PATENT DOCUMENTS

| | | | |
|---|---|---|---|
| 5,089,455 A | | 2/1992 | Ketcham et al. |
| 6,093,338 A | * | 7/2000 | Tani et al. ............... 252/62.9 R |
| 2006/0138899 A1 | * | 6/2006 | Nanataki et al. ............ 310/311 |
| 2008/0206561 A1 | * | 8/2008 | Yokoyama et al. ........... 428/402 |
| 2009/0170686 A1 | * | 7/2009 | Yura et al. ................. 501/135 |
| 2009/0236946 A1 | * | 9/2009 | Yura et al. ................. 310/360 |

FOREIGN PATENT DOCUMENTS

| | | |
|---|---|---|
| EP | 1 972 604 A1 | 9/2008 |
| JP | 08-138459 A1 | 5/1996 |
| JP | 10-330184 | 12/1998 |
| JP | 11-060333 | 3/1999 |
| JP | 2003-012373 | 1/2003 |
| JP | 2007-022857 | 2/2007 |

OTHER PUBLICATIONS

Saito et al., "Synthesis of Polycrystalline Platelike KNbO3 Particles by the Topchemical Micro-Crystal Conversion Method and Fabrication of Grain-Oriented (K0.5Na0.5)NbO3 Ceramics," Journal of the European Ceramic Society, Elsevier Science Publishers, Barking, Essex, GB, vol. 27, No. 13-15, Jan. 1, 2007, pp. 4085-4092.

* cited by examiner

*Primary Examiner* — Humera Sheikh
*Assistant Examiner* — Thomas Mangohig
(74) *Attorney, Agent, or Firm* — Burr & Brown

(57) ABSTRACT

A plate-like polycrystalline particle is produced by forming inorganic particles into a freestanding shaped body, firing the shaped body, and crushing and classifying the fired shaped body. The inorganic particles contain as the main component an oxide that has a general formula of $ABO_3$ and that satisfies $a \times Pb(M'_{1/3},Nb_{2/3})O_3 + b \times PbTiO_3 + c \times PbZrO_3 + z \times M''O$ (wherein $a+b+c=1$, and M' denotes at least one element selected from Mg, Ni and Zn, and M'' denotes at least one element selected from Mg, Ni and Zn), wherein z is in the range of $0.002 \leq z \leq 0.42$. The oxide contains a predetermined excessive amount of M''O such that the plate-like polycrystalline particle contains an excessive amount of M''O. The plate-like polycrystalline particle contains a plurality of crystal grains that have a wavy structure composed of wavy grain boundaries. The plate-like polycrystalline particle is easily crushed at the grain boundaries and has a high degree of orientation.

6 Claims, 8 Drawing Sheets

Experimental Example 11 (Normal grain boundary)

PLATE-LIKE POLYCRYSTALLINE PARTICLE

BACKGROUND OF THE INVENTION

1. Field of the Invention

The present invention relates to a plate-like polycrystalline particle.

2. Description of the Related Art

In some known grain-oriented ceramics, the degree of orientation of a particular crystal face is increased to improve the piezoelectric characteristics (see, for example, Japanese Unexamined Patent Application Publications No. 11-60333 and No. 2003-12373). As methods for producing grain-oriented ceramics, for example, Japanese Unexamined Patent Application Publications No. 2003-12373 and No. 10-330184 have proposed a method that includes the steps of mixing a host material A having shape anisotropy with a guest material B, which has crystal matching with at least one crystal face of the host material A and has low crystal anisotropy, orienting crystal faces of the host material A, and firing the host material A and the guest material B to orient crystal faces of the guest material B. Thus, the resulting ceramic has a high degree of crystalline orientation even though the guest material B has low crystal anisotropy. Japanese Unexamined Patent Application Publication No. 2007-22857 has proposed to increase the degree of crystalline orientation of a host material itself by hydrothermal synthesis.

However, in these methods according to Japanese Unexamined Patent Application Publications No. 11-60333, No. 2003-12373, and No. 10-330184, the size and the aspect ratio of host material particles are difficult to alter because the host material is a single crystal. An increase in the aspect ratio of host material particles to increase the degree of crystalline orientation in forming results in an increase in primary particle size. Use of host material particles having a large primary particle size may result in poor sintering or a low density or large particle size of a grain-oriented ceramic product. This finally causes deterioration in mechanical strength or insulating properties of the ceramic product. In Japanese Unexamined Patent Application Publication No. 2003-12373, after a plate crystal having a composition of a layered perovskite structure is prepared, an undesirable element of the composition is replaced by a desired element. However, in some cases, the replacement does not proceed sufficiently, and part of the undesirable element remains in the final material. Furthermore, the process is complicated. In Japanese Unexamined Patent Application Publication No. 2007-22857, a host material is produced by hydrothermal synthesis in which an aqueous solution containing raw materials is subjected to high temperature and pressure. Thus, the synthesis takes a lot of time.

SUMMARY OF THE INVENTION

In view of the situations described above, it is an object of the present invention to provide a plate-like polycrystalline particle that has an increased degree of crystalline orientation and an easily adjustable particle size or aspect ratio. It is another object of the present invention to provide a plate-like polycrystalline particle having a highly uniform composition.

As a result of diligent research to achieve the objects described above, the present inventors completed the present invention by finding that when crystal grains include an oxide having a general formula of $ABO_3$ as the main component, in which the A site is Pb and the B site contains a predetermined excessive amount of M (wherein M denotes at least one element selected from Mg, Ni, and Zn), and when the crystal grains have wavy grain boundaries including concave portions and convex portions, the crystal grains are oriented while particular crystal faces of the crystal grains are uniformly aligned, so that the piezoelectric and electrostrictive characteristics of a plate-like polycrystalline particle composed of the crystal grains are improved and that the particle size and the aspect ratio of the plate-like polycrystalline particle can be altered easily.

According to one aspect of the present invention, a plate-like polycrystalline particle contains a plurality of crystal grains that have a wavy structure composed of wavy grain boundaries in cross section. The wavy grain boundaries include concave portions and convex portions. The concave portions and the convex portions mate with convex portions and concave portions of adjacent crystal grains, respectively.

The plate-like polycrystalline particle has a high degree of crystalline orientation. The particle size and the aspect ratio of the plate-like polycrystalline particle can be altered easily. While the reason for those is not clear, the reason is assumed as described below. When a shaped body composed of crystal grains that contain a predetermined excessive amount of MO (M denotes at least one element selected from Mg, Ni, and Zn) is fired, the excess MO substitutes for part of the main component of the crystal grains to form a defect. The defect promotes the diffusion of an element and thereby reduces the interfacial energy of a grain boundary. Thus, the grains have wavy boundaries including concave portions and convex portions, and the crystal faces of the grains are easily oriented in a predetermined direction. Since the plate-like polycrystalline particle is composed of crystal grains bound to each other at grain boundaries, the plate-like polycrystalline particle is easily crushed at the grain boundaries. Thus, the particle size and the aspect ratio of the plate-like polycrystalline particle can be altered easily. Since MO is also contained in the main component, an additive containing an undesired element is not needed. Thus, the plate-like polycrystalline particle has a highly uniform composition. The clause "additive is not needed", as used herein, is not intended to exclude the use of an additive for further increasing the degree of orientation.

DETAILED DESCRIPTION OF THE INVENTION

Figure 1:
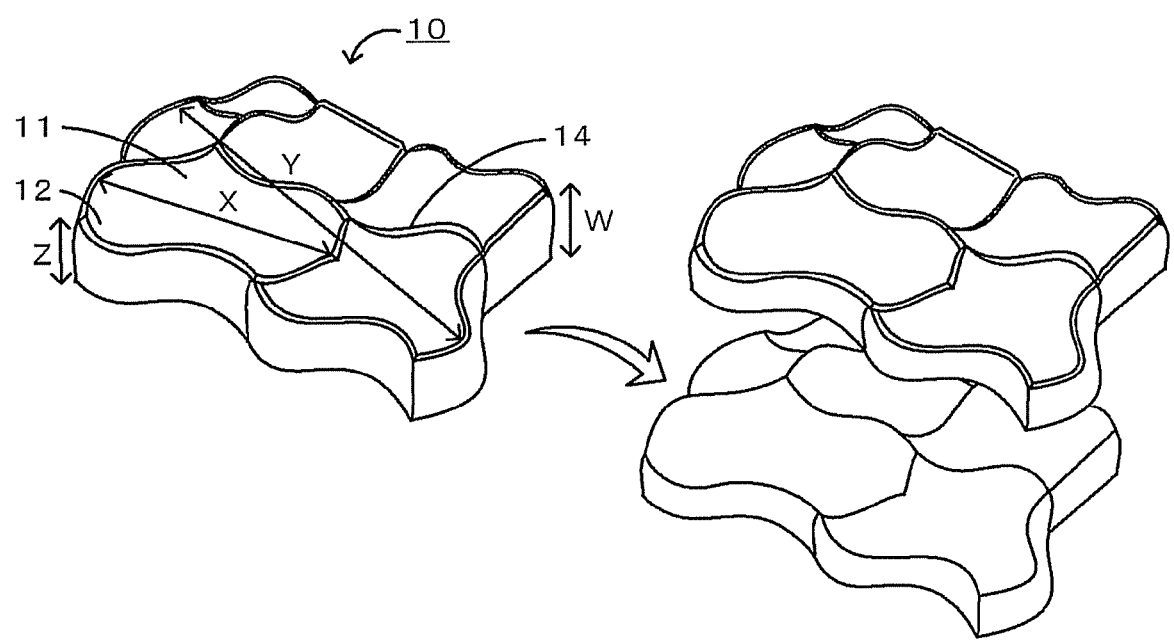
FIG. 1 is an explanatory drawing of a plate-like polycrystalline particle 10 according to an embodiment of the present invention.
Figure 2:
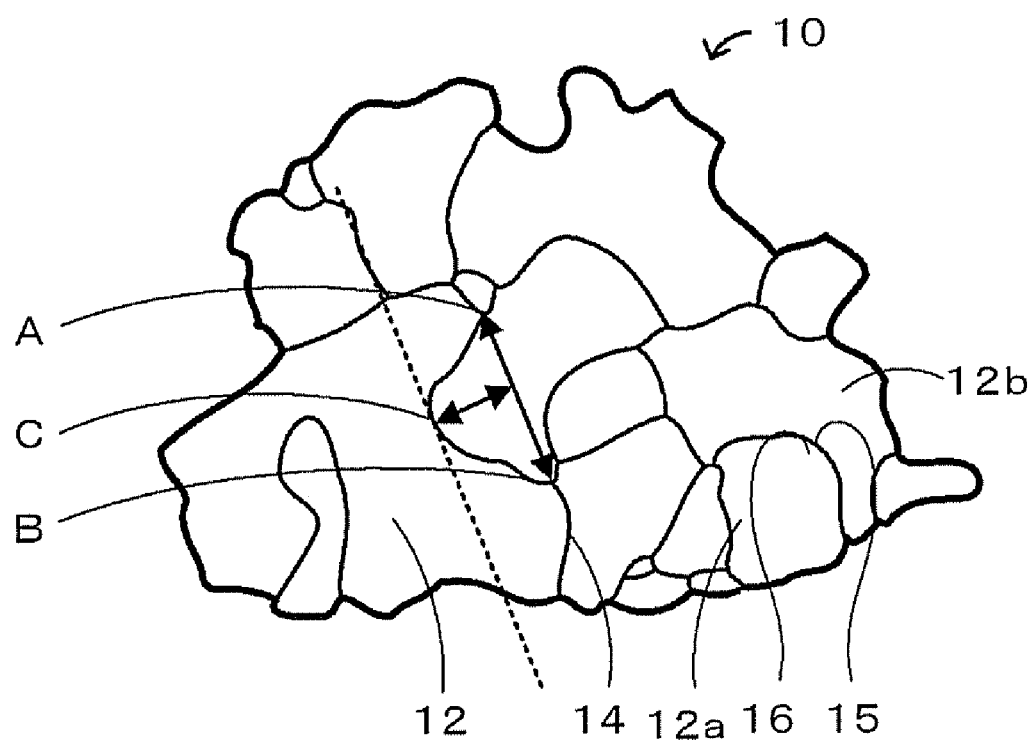
FIG. 2 is a plan view of the plate-like polycrystalline particle 10.

A plate-like polycrystalline particle according to an embodiment of the present invention will be described below with reference to the drawings. FIG. 1 is an explanatory drawing of a plate-like polycrystalline particle 10 according to the present embodiment. FIG. 2 is a plan view of the plate-like polycrystalline particle 10. The plate-like polycrystalline particle 10 contains a plurality of crystal grains 12 having a particular crystal face 11. In a cross section parallel to the crystal faces 11, the plate-like polycrystalline particle 10 has a wavy structure composed of wavy grain boundaries 14, which have concave portions and convex portions. The concave portions and the convex portions mate with convex portions and concave portions of adjacent crystal grains, respectively. For example, as illustrated in FIG. 2, a convex portion 16 of a crystal grain 12a mates with a concave portion 15 of an adjacent crystal grain 12b. The concave portion 15 of the crystal grain 12b mates with the convex portion 16 of the adjacent crystal grain 12a. The phrase "in cross section", as used herein, does not mean practically viewing a cross section. In three-dimensional observation of a plate-like polycrystalline particle with a scanning electron microscope (SEM), when crystal grains having a spherical top surface overlap one another, a series of curved lines (curved surfaces) may be observed. However, this is not the case. The phrase "in cross section" means that it is sufficient if grain boundaries composed of curved lines can be observed in the cross section.

The wavy structure of the plate-like polycrystalline particle 10 has a curvature preferably in the range of 0.1 to 0.9 and more preferably in the range of 0.3 to 0.8. As described in detail below, the curvature is defined by the length of a first straight line between adjacent triple points of grain boundaries and the maximum length of a perpendicular line from the first straight line to a grain boundary between the adjacent triple points. At a curvature of at least 0.1, the plate-like polycrystalline particle 10 can have a high degree of orientation. The curvature is calculated in the following manner with reference to FIG. 2. First, the average grain size is determined from a SEM photograph in a visual field that includes 20 to 40 crystal grains. The average grain size is a mean value of the maximum lengths of crystal faces of all the crystal grains that are entirely included in the visual field (i.e., excluding grain fragments cut at the edge of the visual field). Five grains having a size larger than the average grain size are arbitrarily selected. In the selected grains, a first straight line is drawn between two triple points of adjacent grain boundaries (i.e., where three adjacent grains meet) (for example, points A and B in FIG. 2). A second straight line parallel to the first straight line is drawn as shown by the dotted line in FIG. 2. The second straight line is in contact with the grain boundary at the point C between the two triple points A and B. The length of the perpendicular line from the point C to the first straight line is measured. The ratio of the length of the perpendicular line to the length of the first straight line is calculated for all the triple points and grain boundaries of a selected grain. The maximum ratio is taken as the curvature of the crystal grain. The mean value of the curvatures of the five selected crystal grains is considered as the curvature of the plate-like polycrystalline particle 10.

The plate-like polycrystalline particle 10 contains substantially one crystal grain 12 in the thickness direction. A plurality of crystal grains 12 are bound to each other at grain boundaries 14 while the particular crystal faces 11 of the crystal grains 12 are aligned. Thus, in the plate-like polycrystalline particle 10, a plurality of crystal grains 12 having aligned particular crystal faces 11 are substantially two-dimensionally arranged. The phrase "having aligned particular crystal faces 11", as used herein, means that the crystal faces 11 of crystal grains 12 lie in the same plane, or that the crystal faces 11 are not in the same plane, but are oriented in the same direction, or that most of the crystal faces 11 lie in the same plane or are oriented in the same direction in different planes although some of the crystal faces 11 are oriented in different directions, or other similar states. The plate-like polycrystalline particle 10 is manufactured by forming inorganic particles into a shaped body, firing the shaped body to grow the inorganic particles, and crushing the fired shaped body. For convenience of explanation, a green sheet-like shaped body is referred to as a "shaped body", a shaped body after firing is referred to as a "fired shaped body", and a particle having a predetermined size manufactured by crushing and classifying a fired shaped body are referred to as a "plate-like polycrystalline particle".

In the plate-like polycrystalline particle 10, the number of crystal grains present in the thickness direction of the particle at any one point is substantially one. The expression "the number of crystal grains present in the thickness direction of the particle at any one point is substantially one" means that even if crystal grains 12 overlap in some part, in most parts, crystal grains 12 do not overlap and the number of crystal grains 12 present in the thickness direction of the particle at any one point is only one". This does not cover the case where in most parts of the plate-like polycrystalline particle 10, such as in the center region, two or more crystal grains 12 overlap and are bonded with each other, and only in the end region, the number of crystal grains present in the thickness direction of the particle at any one point is one. In the plate-like polycrystalline particle 10, since the material present in the thickness direction of the particle is limited, when grain growth occurs due to firing or the like, the number of crystal grains 12 present in the thickness direction of the particle at any one point is substantially one, and grain growth is promoted in the surface direction rather than the thickness direction of the particle. Therefore, flat crystal grains 12 are arranged in the surface direction of the particle and the specific crystal face 11 is oriented in a preferred direction. In the plate-like polycrystalline particles 10, crystal grains 12 may overlap or the crystal faces 11 may be oriented in different directions locally in some parts because crystal grains 12 do not reach the extremity of the thickness direction of the sheet-like shaped body during grain growth or crystal faces 11 are oriented in different directions. However, generally, a plurality of crystal grains 12 with crystal faces 11 oriented in the same direction are bonded together at grain boundaries 14. In the plate-like polycrystalline particle 10, the percentage of the portion which includes only one crystal grain 12 in the thickness direction at any one point is preferably 70% or more, more preferably 80% or more, and most preferably 90% or more, in terms of area ratio. The area ratio is determined by a method in which electron microscope observation (SEM observation) is performed in a state where plate-like polycrystalline particles 10 are dispersed as much as possible, and the ratio of the area contained in the SEM photograph is calculated. Furthermore, it is also possible to estimate the area of the portion which includes only one crystal grain 12 in the thickness direction at any one point from the total area of crystal grains whose length in the surface direction is larger than the thickness. In the plate-like polycrystalline particle 10, the percentage of the portion in which crystal grains 12 overlap is a fraction of the whole (e.g., 30% or less in terms of area ratio), and at grain boundaries 14 where crystal grains 12 are bonded together, such a portion can be relatively easily separated by crushing.

In the plate-like polycrystalline particle 10 of the present invention, the length Y in the longitudinal direction of the plate-like polycrystalline particle 10 (refer to FIG. 1) can be set at 1.0 mm or less, 50 μm or less, or 20 μm or less. The length Y can be changed appropriately according to the size of the intended plate-like polycrystalline particle 10. The ratio of the length Y in the longitudinal direction of the plate-like polycrystalline particle 10 to the thickness W of the plate-like polycrystalline particle 10, i.e., the aspect ratio (Y/W) of the plate-like polycrystalline particle 10 is preferably 2 to 100. For example, when the plate-like polycrystalline particles 10 are used as a raw material for producing a crystallographically-oriented ceramic, at an aspect ratio of the plate-like polycrystalline particle 10 of 2 or more, orientation can be easily performed during shaping, and crystallographic orientation can be increased. At an aspect ratio of 100 or less, for example, in the crushing step, which will be described below, pulverization is not easily performed, and the aspect ratio can be maintained. Consequently, it is possible to easily obtain a shaped body in which the plate-like polycrystalline particles 10 are oriented in a preferred direction. The thickness W of the plate-like polycrystalline particle 10 is defined as the length at the thickest portion of the plate-like polycrystalline particle 10. The thickness W of the plate-like polycrystalline particle 10 is preferably 15 μm or less, more preferably 10 μm or less, still more preferably 5 μm or less, and most preferably 2 μm or less. The thickness W is preferably 0.1 μm or more. If the thickness W is 0.1 μm or more, a planar plate-like polycrystalline particle 10 can be easily formed. If the thickness W is 15 μm or less, the degree of orientation can be increased. The thickness W of the plate-like polycrystalline particle 10 is usually substantially the same as the thickness Z of the crystal grain 12. The aspect ratio of the plate-like polycrystalline particle 10 is determined by the method described below. First, a SEM photograph is taken by a scanning electron microscope, and the thickness W of the plate-like polycrystalline particle 10 is determined from the SEM photograph. Then, the plate-like polycrystalline particles 10 are placed in a solvent, such as an alcohol, in an amount of 1% to 10% by weight, and dispersed, for example, using an ultrasonic wave for 30 minutes. The dispersion liquid is dispersed on a glass substrate in the form of a thin layer by spin-coating at 1,000 to 4,000 rpm such that the plate-like polycrystalline particles 10 are prevented from overlapping each other as much as possible and that the crystal faces included in the plate-like polycrystalline particles 10 are parallel to the surface of the substrate. SEM observation is performed in such a state. In a field of view which includes about 5 to 30 plate-like polycrystalline particles 10, the crystal faces of the plate-like polycrystalline particles 10 are observed. The longest length Y of each plate-like polycrystalline particle 10 is determined from the SEM photograph taken. At this stage, overlapping plate-like polycrystalline particles 10 can be ignored. Assuming that the longest length Y is a particle diameter of each plate-like polycrystalline particle 10, the particle diameter is divided by the thickness W of the plate-like polycrystalline particle 10 to calculate the aspect ratio for each plate-like polycrystalline particle 10. The average value of the individual plate-like polycrystalline particles 10 is considered as the aspect ratio of the plate-like polycrystalline particle 10.

In the plate-like polycrystalline particle 10 of the present invention, the thickness Z of the crystal grain 12 is preferably 15 μm or less, more preferably 10 μm or less, still more preferably 5 μm or less, and most preferably 2 μm or less. The thickness Z is preferably 0.1 μm or more. If the thickness Z is 0.1 μm or more, a planar plate-like polycrystalline particle 10 can be easily formed. If the thickness Z is 15 μm or less, the degree of orientation can be further increased. If the thickness Z is 15 μm or less, since the grain growth in the thickness direction is limited and grain growth is more promoted in the surface direction of the plate-like polycrystalline particle 10, a specific crystal face grows in the surface of the plate-like polycrystalline particle 10, and thus the aspect ratio and the degree of orientation are increased.

In the plate-like polycrystalline particle 10 of the present invention, the ratio of the length X in the crystal face 11 direction of the crystal grain 12 to the thickness Z of the crystal grain 12 (refer to FIG. 1), i.e., the aspect ratio (X/Z) of the crystal grain 12, is preferably 1 or more, more preferably 2 or more, and still more preferably 4 or more. If the aspect ratio is 2 or more, since the crystal grains 12 are easily oriented, the degree of orientation of the plate-like polycrystalline particle 10 is also increased. The aspect ratio is preferably 50 or less. If the aspect ratio is 50 or less, the size of the plate-like polycrystalline particle 10 can be easily adjusted. The aspect ratio of the crystal grain 12 is determined by the method described below. First, a SEM photograph is taken by a scanning electron microscope, and the thickness Z of the crystal grain 12 is determined from the SEM photograph. Then, as in the determination of the aspect ratio of the plate-like polycrystalline particle 10, SEM observation is performed in a state where the plate-like polycrystalline particles 10 are dispersed in the form of a thin layer such that the plate-like polycrystalline particles 10 are prevented from overlapping each other as much as possible. In a field of view which includes about 20 to 40 crystal grains 12, the crystal faces of the plate-like polycrystalline particles 10 are observed. The longest length X of the crystal face 11 of each crystal grain 12 is determined from the SEM photograph taken. At this stage, overlapping plate-like polycrystalline particles 10 can be ignored. Assuming that the longest length X is a grain diameter of the crystal gain 12, the grain diameter is divided by the thickness Z of the crustal grain 12 to calculate the aspect ratio for each crystal grain 12. The average value of the individual crystal grains 12 is considered as the aspect ratio of the crystal grains 12 contained in the plate-like polycrystalline particle 10.

In the plate-like polycrystalline particle 10 of the present invention, the length X in the crystal face 11 direction of the crystal grain 12 is preferably 50 μm or less, more preferably 25 μm or less, and most preferably 20 μm or less. If the length X is 50 μm or less, the size of the plate-like polycrystalline particle 10 can be easily adjusted. The ratio of the length Y in the longitudinal direction of the plate-like polycrystalline particle 10 to the length X in the crystal face direction of the crystal grain 12, i.e., Y/X, is preferably 3 to 100. For example, when the plate-like polycrystalline particles 10 are used as a raw material for producing a crystallographically-oriented ceramic, if the Y/X is 3 or more, the aspect ratio of the plate-like polycrystalline particles 10 can be increased, and thus crystallographic orientation can be increased. If the Y/X is 100 or less, since the grain index of the plate-like polycrystalline particles 10 contained in the crystallographically-oriented ceramic decreases, orientation is easily performed and the crystallographically-oriented ceramic can be easily molded.

The plate-like polycrystalline particle 10 is manufactured through a raw material preparation step of preparing inorganic particles, which contain as the main component an oxide having a general formula of $ABO_3$ and satisfy the following Equation 1, wherein z is in the range of $0.002 \leq z \leq 0.42$, a forming step of forming the inorganic particles into a freestanding shaped body, a firing step of firing the shaped body alone or in combination with an inert layer that does not substantially react with the shaped body, and a crushing step of passing the fired shaped body through openings having a predetermined size to crush and classify the fired shaped body. The inorganic particles are prepared such that the fired shaped body contains a predetermined excessive amount of M component. The value z is preferably in the range of 0.002≦z≦0.42 and more preferably in the range of 0.06≦z≦0.1. At 0.06≦z≦0.1, the plate-like polycrystalline particle 10 can have a higher degree of orientation. Preferably, the oxide having a general formula of ABO₃ has a perovskite structure. The term "main component", as used herein, means that the content of a composition of a three-component solid solution system having a general formula ABO₃ in Equation 1 is at least 70% by weight and preferably at least 90% by weight.

[Equation 1]

$$a \times Pb(M'_{1/3}Nb_{2/3})O_3 + b \times PbTiO_3 + c \times PbZrO_3 + zM''O$$
(a+b+c=1, M' denotes at least one element selected from Mg, Ni and Zn, and M'' denotes at least one element selected from Mg, Ni and Zn)     Equation 1

The degree of orientation of the particular crystal faces 11 in the plate-like polycrystalline particle 10 is preferably at least 15%, more preferably at least 30%, and most preferably at least 60%, as determined by the Lotgering method. The degree of orientation of at least 15% is sufficient to perform the secondary orientation of the plate-like polycrystalline particles 10 to form a grain-oriented ceramic. At a degree of orientation of at least 60%, the plate-like polycrystalline particle 10 can have more excellent characteristics. The particular crystal face 11 may be an in-plane pseudo-cubic (100) plane of the fired shaped body. The term "pseudo-cubic (100)" means that although isotropic perovskite oxides have a slightly distorted cubic structure, such as tetragonal, orthorhombic, or trigonal, because the distortion is very small, the slightly distorted cubic structure is assumed to be a cubic structure expressed by the Miller indices. The degree of orientation by the Lotgering method is calculated by Equation 2 from an XRD diffraction pattern of the plate-like polycrystalline particles 10. The XRD diffraction pattern is measured by placing the plate-like polycrystalline particles 10 on a sample holder substrate, such that the maximum orientation of the crystal faces 11 is achieved. In the measurement of the XRD diffraction pattern, as in the sample preparation in the SEM observation for determining the aspect ratio, the plate-like polycrystalline particles 10 are uniformly dispersed so as to minimize the overlap between the plate-like polycrystalline particles 10 and to align the crystal faces 11 parallel to the surface of the substrate, such as a glass substrate. It is preferable to confirm by SEM observation that the plate-like polycrystalline particles 10 are well dispersed. In Equation 2, ΣI(hkl) is the sum of X-ray diffraction intensities of all the crystal faces (hkl) measured in the plate-like polycrystalline particles, ΣI₀(hkl) is the sum of X-ray diffraction intensities of all the crystal faces (hkl) measured in non-oriented plate-like polycrystalline particles having the same composition as the plate-like polycrystalline particles, Σ'I(HKL) is the sum of X-ray diffraction intensities of crystallographically equivalent particular crystal faces (for example, a (100) plane) measured in the plate-like polycrystalline particles, and Σ'I₀(HKL) is the sum of X-ray diffraction intensities of particular crystal faces measured in non-oriented plate-like polycrystalline particles having the same composition as the plate-like polycrystalline particles.

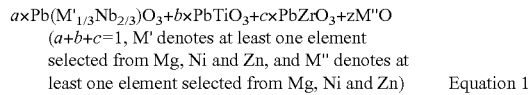

[Equation 2]

A method for producing the plate-like polycrystalline particles 10 will now be described. A method for producing plate-like polycrystalline particles according to the present invention includes (1) a preparation step of inorganic particles which are raw materials for a plate-like polycrystalline particle, (2) a shaping step of forming the inorganic particles into a sheet-like shaped body, (3) a firing step of the shaped body, and (4) a pulverizing step of the fired shaped body using a mesh. The individual steps will be described below in that order.

(1) Preparation of Inorganic Particles

Preferably, the inorganic particles for use in the manufacture of the plate-like polycrystalline particle 10 form an oxide having a perovskite structure. Preferably, the oxide has a general formula of ABO₃, in which the A site contains Pb and the B site contains at least one element selected from Zr, Ti, Nb, Mg, Ni, and Zn. The oxide having a general formula of ABO₃ may have a composition satisfying Equation 1, in which the value z representing excess M component is in the range of 0.002≦z≦0.42. When the M component is contained in an excessive amount, the M component is preferably at least one element selected from Mg, Ni, and Zn and is more preferably an oxide, such as MgO, NiO, or ZnO. In these cases, an excessive amount of M component can easily exert its effects. In a perovskite oxide having a general formula of ABO₃ in which the A site contains Pb and the B site contains at least two elements selected from Zr, Ti, Nb, Mg, Ni, and Zn, when the composition is controlled to allow the perovskite oxide to grow as an ultrathin shaped body, the perovskite oxide may grow into grains having wavy grain boundaries. In this case, the growth of a (100) plane in a shaped body may facilitate the orientation of the (100) plane in a direction perpendicular to the shaped body. In such an oxide, when grains have faces parallel to the top surface of the shaped body, other faces (i.e., side faces) of the grains function as growth surfaces that grow horizontally within the shaped body. Thus, the faces of the grains parallel to the top surface of the shaped body can be easily expanded, and the grains have a large aspect ratio.

In the raw material preparation step, preferably, raw materials for the inorganic particles are pulverized and mixed, the mixed powder is calcined, and the resulting inorganic particles are further pulverized. As the raw materials for the inorganic particles, oxides, hydroxides, carbonates, sulfates, nitrates, tartrates, or the like of the desired components may be used. Preferably, oxides and carbonates are mainly used. In the pulverization of the inorganic particles, the particle diameter is preferably set according to the thickness of the shaped body. The median diameter (D50) of the inorganic particles is preferably 2% to 60% of the thickness of the shaped body. If the median diameter is 2% or more of the thickness of the shaped body, pulverization can be easily performed. If the median diameter is 60% or less of the thickness of the shaped body, the thickness of the shaped body can be easily adjusted because the particles in the shaped body are more homogeneously distributed. Furthermore, in order to increase the size of the crystal grains 12, preferably, the median diameter (D50) of the inorganic particles is decreased from the standpoint of promoting grain growth. The particle diameter is determined using a method in which inorganic particles are dispersed in a dispersion medium (organic solvent, water, or the like), and the particle diameter is measured using a laser diffraction/scattering particle size distribution analyzer. The pulverization of the inorganic particles is preferably conducted by wet pulverization. For example, a ball mill, a bead mill, a trommel, an attritor, or the like may be used.

(2) Shaping Step of Forming Shaped Body

The inorganic particles are formed into a self-supported, sheet-like shaped body with a thickness of 15 μm or less. Note that the "self-supported shaped body" includes a shaped body that alone can maintain the shape of a sheet-like shaped body, and also includes a shaped body that alone cannot maintain the shape of a sheet-like shaped body but that has been bonded or formed on a substrate and separated from the substrate before or after firing. The shaped body can be formed, for example, by a doctor-blade method using a slurry containing the inorganic particles, or extrusion molding using a puddle containing the inorganic particles. When the doctor-blade method is used, for example, a slurry is applied to a flexible plate (e.g., organic polymer plate, such as PET film), the applied slurry is solidified by drying to form a shaped body, and the shaped body is separated from the plate. Thereby, a shaped body of the plate-like polycrystalline particles before firing may be obtained. When a slurry or a puddle is prepared before shaping, the inorganic particles may be dispersed in an appropriate dispersion medium, and a binder, a plasticizer, or the like may be appropriately added thereto. The slurry is preferably adjusted so as to have a viscosity of 50000 to 500000 cP and is preferably defoamed under reduced pressure. The thickness of the shaped body is 15 μm or less, preferably 10 μm or less, and more preferably 5 μm or less, and most preferably 2 μm or less. At 15 μm or less, a high degree of orientation of the crystal grains 12 can be obtained, and at 10 μm or less, a higher degree of orientation of the crystal grains 12 can be obtained. The thickness of the shaped body is preferably 0.1 μm or more. If the thickness of the shaped body is 0.1 μm or more, a self-supported, sheet-like shaped body can be easily formed. In order to relatively increase the size of the crystal grains 12, preferably, the thickness of the shaped body is set at about 5 to 10 μm. The thickness of the sheet-like shaped body is substantially equal to the thickness of the plate-like polycrystalline particles 10, and also relates to the grain diameter of the crystal grains 12. Therefore, the thickness of the sheet-like shaped body is appropriately set according to the application of the plate-like polycrystalline particles 10. Examples of other shaping methods that may be used include high-speed spraying of particles, such as aerosol deposition; and a method in which a film is formed on a substrate made of a resin, glass, ceramic, metal, or the like by a vapor-phase method, such as sputtering, CVD, or PVD, and then the film is separated from the substrate to obtain a shaped body of the plate-like polycrystalline particles before firing. In this case, since the density of the shaped body before firing can be increased, grain growth proceeds at low temperature, volatilization of constituent elements can be prevented, and the resulting plate-like polycrystalline particles have high density, all of which are advantageous.

(3) Firing Step of Shaped Body

A shaped body formed in the forming step is fired alone or in combination with an inert layer (for example, a fired ceramic sheet, a Pt sheet, a carbon sheet, a graphite sheet, a molybdenum sheet, or a tungsten sheet) that does not substantially react with the shaped body. For example, a shaped body may be placed on a layer, such as an alumina, zirconia, spinel, carbon, graphite, molybdenum, tungsten, or platinum layer, that is inert at the firing temperature of the shaped body. A shaped body and an inert layer may be wound into a roll. After a shaped body formed on an inert layer is fired, the shaped body may be removed from the inert layer. Alternatively, after a shaped body formed on an inert layer is fired, the inert layer may be removed from the shaped body. For example, after a desired fired shaped body is produced on an inert graphite layer by firing in a nonoxidizing atmosphere (for example, in a nitrogen atmosphere), the shaped body is heat-treated at the firing temperature or a lower temperature in an oxidizing atmosphere (for example, in the air) to remove the graphite layer by combustion. Since the grain growth in the thickness direction of a shaped body is limited by the thickness of the shaped body (15 μm or less), grains, and therefore particular crystal faces, tend to grow horizontally. Thus, the grains have a high aspect ratio and a high degree of orientation. The shaped body contains substantially one crystal grain in the thickness direction. The aspect ratio of the crystal grain is preferably at least two and more preferably at least three. Crystal grains having an aspect ratio of at least two can be oriented easily. Preferably, the length of each of the crystal grains in the horizontal direction of a plate-like polycrystalline particle is not less than the length of each of the crystal grains in the thickness direction. The aspect ratio of a plate-like polycrystalline particle is determined in the following manner. First, the thickness W of a plate-like polycrystalline particle is determined by SEM observation, as described above. The maximum length Y is considered as the particle size of the plate-like polycrystalline particle in a visual field that includes about 20 to 40 crystal grains. The maximum length Y is divided by the thickness W to calculate the aspect ratio of each plate-like polycrystalline particle. The aspect ratios are averaged to determine the aspect ratio of a plate-like polycrystalline particle.

Preferably, a shaped body is fired at a temperature at least 10% higher than the firing temperature at which crystals in an equilibrium form can be manufactured, for example, the firing temperature at which a bulk is fired for densification and grain growth. At that temperature, crystals in an ultrathin shaped body can grow sufficiently. Preferably, the firing temperature is as high as possible, provided that shaped body materials do not decompose. In particular, in a shaped body having a smaller thickness, because the grain growth is difficult, the firing temperature is preferably increased. For example, a shaped body formed of inorganic particles that contain as the main component $Pb(Zr_{1-x}Ti_x)O_3$ and Mg or Nb in the B site is fired at a temperature in the range preferably of 900° C. to 1400° C. and more preferably of 1000° C. to 1350° C. At a firing temperature of 900° C. or more, the crystal growth is promoted. At a firing temperature of 1400° C. or less, the evaporation or decomposition of components of the shaped body are reduced. Thus, the inorganic particles can grow into crystal grains having an oriented particular crystal face. When a shaped body contains an organic substance, such as a binder, the shaped body may be heat-treated mainly for degreasing before firing. The degreasing temperature should be high enough to decompose the organic substance (for example, in the range of 400° C. to 600° C.). Preferably, after degreasing, cold isostatic pressing (CIP) is performed before firing. The CIP can compensate for a decrease in the degree of orientation caused by degreasing, or reduce a decrease in the density of a sintered shaped body due to the volume expansion of the shaped body.

Preferably, a shaped body is fired with another material that volatilizes faster than the shaped body but does not volatilize beyond a predetermined evaporation level (hereinafter referred to as a "low volatilization condition"). The term "low volatilization condition", as used herein, includes a condition where a shaped body is fired in the presence of a material (for example, inorganic particles) that contains a volatile component in an amount larger than a volatile component in the shaped body and that has such volatility that does not inhibit the growth of oriented crystal grains. In particular, when coexisting inorganic particles with which a shaped body is fired have such a composition that a volatile component (for example, lead) can volatile more easily than the components in the shaped body, the degree of orientation is improved. Preferably, the coexisting material contains a smaller amount of $Pb(M_x,Nb_y)O_3$ and a larger amount of $PbZrO_3$ than the shaped body. The coexisting material may contain a larger amount of $PbTiO_3$ than the shaped body. The coexisting material may contain a smaller amount of excess MO than the shaped body. It is important to empirically optimize the firing conditions, such as the amount and composition of coexisting inorganic particles, the location of the coexisting inorganic particles in a container, the volume of the container, and the installation and the amount of a shaped body. In particular, when the coexisting inorganic particles have a composition of excess volatility, not only the growth of oriented crystal grains is inhibited, but also an excess lead component is absorbed into a plate-like polycrystalline particle 10, causing deterioration in performance. Coexisting inorganic particles having excessively low volatility disadvantageously reduce the degree of orientation of a plate-like polycrystalline particle. A shaped body may be fired under pressure, for example, by hot pressing, to promote in-plane grain growth. Through these steps, a shaped body is formed.

(4) Pulverizing Step of Fired Shaped Body Using Mesh

Figure 3:
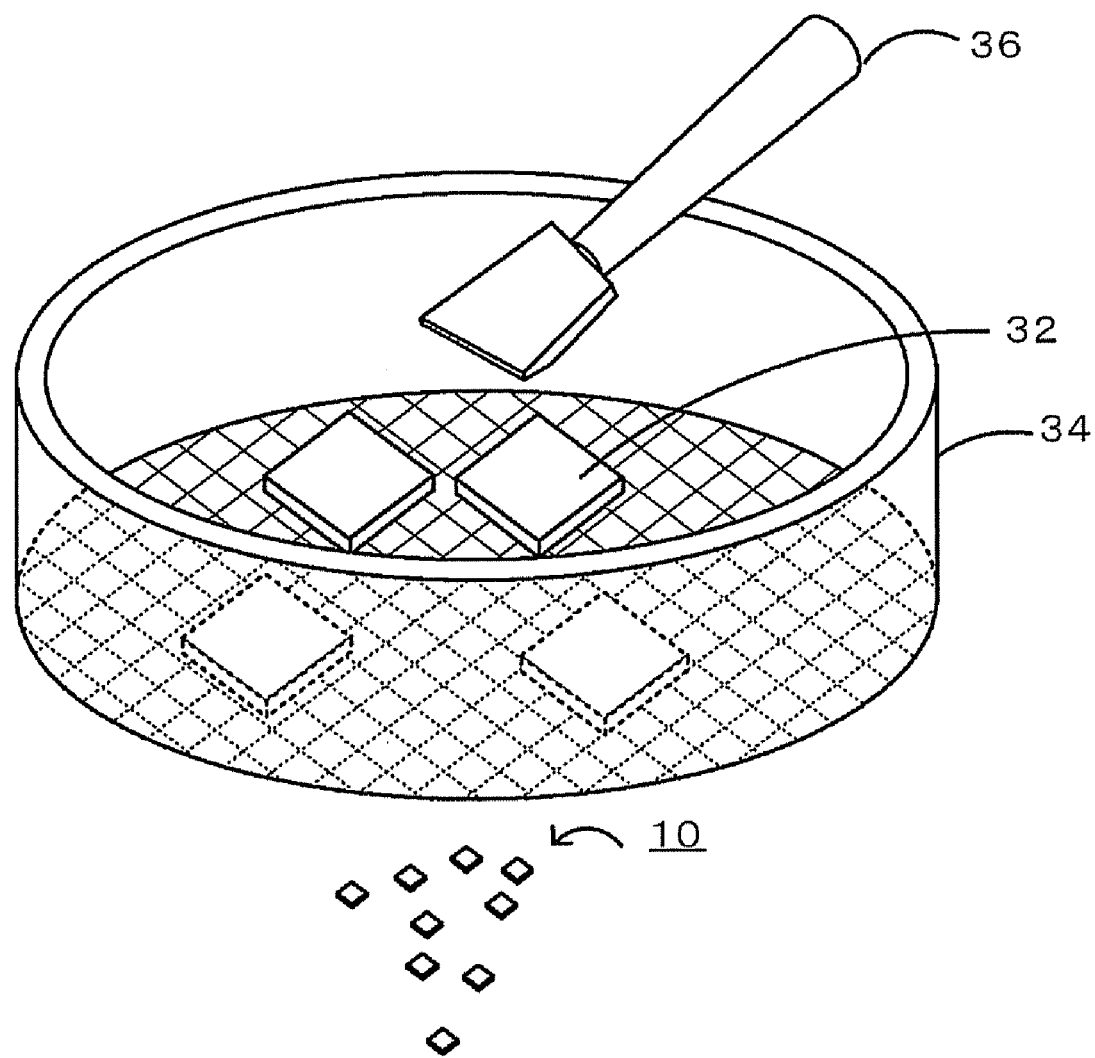
FIG. 3 is an explanatory drawing of a mesh grinding process.

Subsequently, the fired shaped body is crushed and classified. Here, a mesh (sieve) having openings with a size corresponding to a desired particle size is used. Preferably, a mesh with openings of 1.0 mm or less is used. FIG. 3 is a schematic diagram showing an example of a pulverization step using a mesh. In the pulverization step using the mesh, for example, a mesh with an opening diameter of 45 μm, 25 μm, 20 μm, or the like can be used. A fired shaped body 32 obtained by firing the shaped body is relatively easily crushed. Therefore, after the fired shaped body 32 is placed on a mesh 34, by moving the mesh 34 while lightly pressing the fired shaped body 32 with a pressing member 36, such as a spatula, it is possible to carry out the pulverizing step using the mesh. In such a manner, crushing of the fired shaped body 32 and classification of the crushed plate-like polycrystalline particles 10 (refer to FIG. 1) can be performed simultaneously. In order to obtain plate-like polycrystalline particles 10 having a larger particle diameter and a larger aspect ratio, the size of the openings of the mesh is increased. In order to obtain plate-like polycrystalline particles 10 having a smaller particle diameter and a smaller aspect ratio, the size of the openings of the mesh is decreased. By a simple process of changing the size of the openings of the mesh, the properties of the plate-like polycrystalline particles 10 can be changed. In such a manner, the plate-like polycrystalline particles 10 shown in FIG. 1 can be obtained.

Figure 4A:
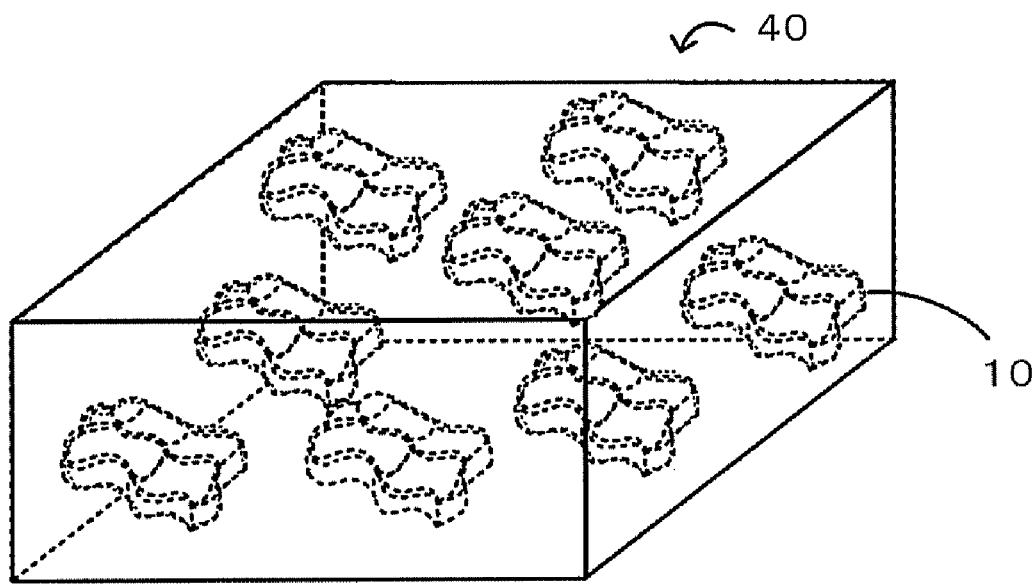
FIGS. 4A and 4B are an explanatory drawing of a method for manufacturing a grain-oriented ceramic 50 according to an embodiment of the present invention.
Figure 4B:
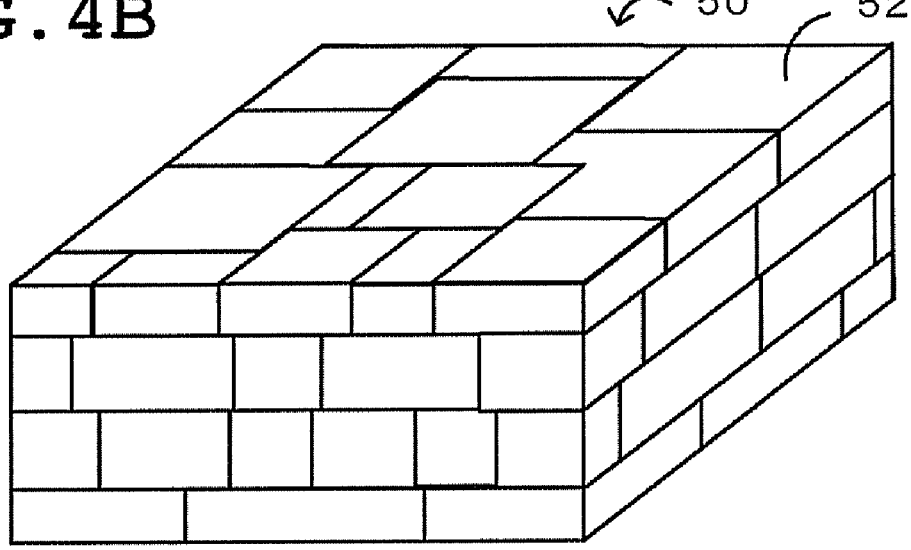

The resulting plate-like polycrystalline particles 10 may be used as a raw material for a crystallographically-oriented ceramic. A method for producing a crystallographically-oriented ceramic using the plate-like polycrystalline particles 10 as a raw material will be described below. The crystallographically-oriented ceramic may be formed into an arbitrary shape, for example, with a thickness exceeding 15 μm. That is, the plate-like polycrystalline particles 10 may be produced as an intermediate product for forming a crystallographically-oriented ceramic. FIGS. 4A and 4B are schematic diagrams showing an example of a method for producing a crystallographically-oriented ceramic, FIG. 4A showing a state after orientation and before firing, FIG. 4B showing a crystallographically-oriented ceramic 50 obtained after firing. A crystallographically-oriented ceramic may be produced by a method including a mixing step of the plate-like polycrystalline particles 10, other raw material powder (e.g., non-oriented inorganic particles), and as necessary, a binder, a plasticizer, or the like; and a second shaping step of forming the mixture into a secondary shaped body 40 (FIG. 4A) with a predetermined shape by orientation-shaping (secondary orientation) in which the plate-like polycrystalline particles 10 are oriented in a predetermined direction. The orientation-shaping can be performed by the doctor-blade method, extrusion molding, or the like described above. Then, a second firing step is carried out in which the secondary shaped body is fired such that the other raw material powder is oriented in the direction in which the plate-like polycrystalline particles 10 are oriented. Thereby, a crystallographically-oriented ceramic 50 which includes an oriented crystals 52 is obtained (FIG. 4B). The firing temperature in the second firing step may be equal to or higher, by 10 percent or more, than the firing temperature at which crystals with the growth form under predetermined firing conditions described above are obtained. When firing is performed after the plate-like polycrystalline particles 10 are oriented in one direction as described above, in the other raw material powder, grain growth proceeds following the crystallographic orientation of the plate-like polycrystalline particles 10, or in the oriented plate-like polycrystalline particles 10, grain growth proceeds while taking in the other raw material powder. Consequently, it is possible to obtain a crystallographically-oriented ceramic 50 including many oriented crystals 52 which are oriented in one direction.

In the plate-like polycrystalline particle 10 according to the present embodiment described in detail above, inorganic particles are formed into a freestanding shaped body having a thickness of 15 μm or less, the shaped body is fired, and the fired shaped body is passed through openings having a predetermined size to crush and classify the fired shaped body. Thus, the aspect ratio and the degree of crystalline orientation of the plate-like polycrystalline particle can be increased by simple treatments. Since the plate-like polycrystalline particle 10 is composed of crystal grains 12 bound to each other at grain boundaries 14, the plate-like polycrystalline particle is easily crushed at the grain boundaries 14. Thus, the particle size and the aspect ratio of the plate-like polycrystalline particle can be altered easily. As compared with manufacture of a grain-oriented ceramic using single crystal grains, therefore, the degree of orientation of a grain-oriented ceramic 50 and the size of an oriented crystal 52 can be easily altered by simple treatments. Furthermore, a predetermined component is contained in an excessive amount, and firing is performed under a predetermined low volatilization condition. Thus, even when a material is mainly composed of $Pb(Zr_{1-x}Ti_x)O_3$, the material can be grown into grains having wavy grain boundaries, thus increasing the crystal orientation. Furthermore, because no additional component is required to increase the orientation, a plate-like polycrystalline particle having a highly uniform composition can be prepared. Thus, use of the plate-like polycrystalline particle 10 in manufacture of the grain-oriented ceramic 50 can provide the grain-oriented ceramic 50 having a uniform composition and a high degree of orientation. The plate-like polycrystalline particle has wavy grain boundaries including concave portions and convex portions, contains a small number of pores, and is dense. Thus, the plate-like polycrystalline particle can effectively act as a template, allowing manufacture of a dense grain-oriented ceramic having a high degree of orientation.

It is to be understood that the present invention is not limited to the embodiment described above, and various embodiments within the scope of the technical field of the present invention can be carried out.

For example, in the embodiment described above, the plate-like polycrystalline particles 10 are used as a raw material for a crystallographically-oriented ceramic 50. The plate-like polycrystalline particles 10 may be used in other applications (such as for fillers). For example, the plate-like polycrystalline particles 10 of the present invention can be used for polycrystalline materials composed of a substance, the function or properties of which have crystallographic orientation dependence, such as dielectric materials, pyroelectric materials, piezoelectric materials, ferroelectric materials, magnetic materials, ion-conducting materials, electron-conducting materials, heat-conducting materials, thermoelectric materials, superconducting materials, and abrasion-resistant materials. Specifically, high-performance elements can be obtained by applying the plate-like polycrystalline particles in various sensors, such as acceleration sensors, pyroelectric sensors, ultrasonic sensors, electric field sensors, temperature sensors, gas sensors, knocking sensors, yaw rate sensors, air bag sensors, and piezoelectric gyro sensors; energy transducers, such as piezoelectric transformers; low-loss actuators or low-loss resonators, such as piezoelectric actuators, ultrasonic motors, and resonators; and other elements, such as capacitors, bimorph piezoelectric elements, vibration pickups, piezoelectric microphones, piezoelectric ignition elements, sonars, piezoelectric buzzers, piezoelectric speakers, oscillators, filters, dielectric elements, microwave dielectric elements, thermoelectric conversion elements, pyroelectric elements, magnetoresistive elements, magnetic elements, superconducting elements, resistance elements, electron-conducting elements, ion-conducting elements, PTC elements, and NTC elements. In such cases, the aspect ratio of the crystal grains 12 and the aspect ratio of the plate-like polycrystalline particles 10 are appropriately set depending on the application. The aspect ratio and the particle size of the plate-like polycrystalline particles 10 can be easily changed simply by setting the diameter of the openings in the mesh.

In the embodiments described above, in the plate-like polycrystalline particles 10, the specific crystal faces 11 are present on the sheet surface and aligned (refer to FIG. 1). However, as long as the crystal grains 12 are two-dimensionally bonded together at the grain boundaries, the crystal faces 11 may not be present on the sheet surface.

EXAMPLES

Experimental examples in which plate-like polycrystalline particles 10 are specifically produced will be described below.

Experimental Example 1

Raw Material Preparation Step

A synthetic powder that was to provide a plate-like polycrystalline particle having a composition of $0.2Pb(Mg_{0.33}Nb_{0.67})O_3 + 0.35PbTiO_3 + 0.45PbZrO_3$ (also referred to as basic composition 1) containing 0.002 mol MgO, zirconia balls, and ion-exchanged water, which was a dispersion medium, were charged in a polypot and were wet-blended in a ball mill for 16 hours. The resulting slurry was dried in a dryer and was calcined at 800° C. for two hours. The calcined powder, zirconia balls, and ion-exchanged water, which was a dispersion medium, were wet-grinded in a ball mill for 16 hours and were dried in a dryer to produce a powder of inorganic particles. The median diameter (D50) of the powder was 0.4 μm, as determined in a dispersion medium of water with a laser scattering particle size distribution analyzer LA-750 manufactured by HORIBA Ltd.

Forming, Firing, and Crushing Steps

A hundred parts by weight of inorganic particles, 100 parts by weight of 1:1 wt/wt mixture of toluene and isopropanol, which serves as a dispersion medium, 10 parts by weight of poly(vinyl butyral) (BM-2, manufactured by Sekisui Chemical Co., Ltd.), which serves as a binder, 4 parts by weight of plasticizer (dioctyl phthalate (DOP), manufactured by Kurogane Kasei Co., Ltd.), and 2 parts by weight of dispersing agent (SP-030, manufactured by Kao Corporation) were blended to prepare raw material slurry. The slurry was applied by a doctor blade method to a polyethylene terephthalate (PET) film to form a shaped body having a thickness of 2 μm as measured after drying. After removed from the PET film, the shaped body was cut into pieces 50 mm square with a cutter and was placed in the center of a zirconia setter (60 mm square, 5 mm in height). The pieces of the shaped body in a magnesia container (90 mm square, 50 mm in height) were degreased at 600° C. for two hours and fired at 1280° C. for two hours under a low volatilization condition in the presence of 20 g of powder (coexisting material) having a composition of $0.12Pb(Mg_{0.33}Nb_{0.67})O_3 + 0.38PbTiO_3 + 0.50PbZrO_3$ containing 0.02 mol NiO (also referred to as firing atmosphere A). The degree of orientation was 20% as determined by the Lotgering method. The determination of the degree of orientation will be described below. The fired pieces were placed on a 300-mesh sieve (opening size: 45 μm) and were lightly pressed with a spatula to crush and classify the pieces. The resulting particles were used as plate-like polycrystalline particles in Experimental Example 1. Table 1 summarizes a basic composition having a general formula of $ABO_3$ in the equation of $a \times Pb(M'_x, Nb_y)O_3 + b \times PbZrO_3 + c \times PbTiO_3 + zM''O$ ($a+b+c=1, x+y=1$, and M' denotes at least one element selected from Mg, Ni and Zn, and M" denotes at least one element selected from Mg, Ni and Zn) excluding an additive component (zM"O) and the composition of the coexisting material. Table 1 also shows the basic compositions and the compositions of coexisting materials in Experimental Examples 2 to 27 described below.

TABLE 1

| | Basic compositions | Compositions of coexisting materials |
|---|---|---|
| Experimental Example 1 | 1) $0.2Pb(Mg_{1/3}Nb_{2/3})O_3 + 0.35PbTiO_3 + 0.45PbZrO_3$ | A) $0.12Pb(Mg_{1/3}Nb_{2/3})O_3 + 0.38PbTiO_3 + 0.50PbZrO_3 + 0.02$ molNiO |
| Experimental Example 2 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02$ molNiO |
| Experimental Example 3 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02$ molNiO |
| Experimental Example 4 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02$ molNiO |

TABLE 1-continued

| | Basic compositions | Compositions of coexisting materials |
|---|---|---|
| Experimental Example 5 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02\ molNiO$ |
| Experimental Example 6 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02\ molNiO$ |
| Experimental Example 7 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02\ molNiO$ |
| Experimental Example 8 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02\ molNiO$ |
| Experimental Example 9 | $0.2Pb(Mg_{1/3}Nb_{2/3})O_3 + 0.35PbTiO_3 + 0.45PbZrO_3$ | $0.12Pb(Mg_{1/3}Nb_{2/3})O_3 + 0.38PbTiO_3 + 0.50PbZrO_3 + 0.02\ molNiO$ |
| Experimental Example 10 | $0.2Pb(Mg_{1/3}Nb_{2/3})O_3 + 0.35PbTiO_3 + 0.45PbZrO_3$ | B) $0.2Pb(Mg_{1/3}Nb_{2/3})O_3 + 0.35PbTiO_3 + 0.45PbZrO_3$ |
| Experimental Example 11 | $0.2Pb(Mg_{1/3}Nb_{2/3})O_3 + 0.35PbTiO_3 + 0.45PbZrO_3$ | C) $0.2Pb(Mg_{1/3}Nb_{2/3})O_3 + 0.35PbTiO_3 + 0.45PbZrO_3 + 0.02\ molNiO$ |
| Experimental Example 12 | $0.2Pb(Mg_{1/3}Nb_{2/3})O_3 + 0.35PbTiO_3 + 0.45PbZrO_3$ | D) $0.2Pb(Mg_{1/3}Nb_{2/3})O_3 + 0.35PbTiO_3 + 0.45PbZrO_3 + 0.02\ molNiO + 0.08\ molMgO$ |
| Experimental Example 13 | 2) $0.2Pb(Mg_{1/3}Nb_{2/3})O_3 + 0.43PbTiO_3 + 0.37PbZrO_3$ | E) $0.12Pb(Mg_{1/3}Nb_{2/3})O_3 + 0.43PbTiO_3 + 0.45PbZrO_3 + 0.02\ molNiO$ |
| Experimental Example 14 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 15 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 16 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 17 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 18 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 19 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 20 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 21 | $0.2Pb(Mg_{1/3}Nb_{2/3})O_3 + 0.43PbTiO_3 + 0.37PbZrO_3$ | $0.12Pb(Mg_{1/3}Nb_{2/3})O_3 + 0.43PbTiO_3 + 0.45PbZrO_3 + 0.02\ molNiO$ |
| Experimental Example 22 | $0.2Pb(Mg_{1/3}Nb_{2/3})O_3 + 0.43PbTiO_3 + 0.37PbZrO_3$ | F) $0.2Pb(Mg_{1/3}Nb_{2/3})O_3 + 0.43PbTiO_3 + 0.37PbZrO_3$ |
| Experimental Example 23 | $0.2Pb(Mg_{1/3}Nb_{2/3})O_3 + 0.43PbTiO_3 + 0.37PbZrO_3$ | G) $0.2Pb(Mg_{1/3}Nb_{2/3})O_3 + 0.43PbTiO_3 + 0.37PbZrO_3 + 0.02\ molNiO$ |
| Experimental Example 24 | $0.2Pb(Mg_{1/3}Nb_{2/3})O_3 + 0.43PbTiO_3 + 0.37PbZrO_3$ | H) $0.2Pb(Mg_{1/3}Nb_{2/3})O_3 + 0.43PbTiO_3 + 0.37PbZrO_3 + 0.02\ molNiO + 0.08\ molMgO$ |
| Experimental Example 25 | $0.2Pb(Mg_{1/3}Nb_{2/3})O_3 + 0.43PbTiO_3 + 0.37PbZrO_3$ | E) $0.12Pb(Mg_{1/3}Nb_{2/3})O_3 + 0.43PbTiO_3 + 0.45PbZrO_3 + 0.02\ molNiO$ |
| Experimental Example 26 | 3) $0.25Pb(Ni_{1/3}Nb_{2/3})O_3 + 0.40PbTiO_3 + 0.35PbZrO_3$ | I) $0.18Pb(Ni_{1/3}Nb_{2/3})O_3 + 0.40PbTiO_3 + 0.42PbZrO_3$ |
| Experimental Example 27 | 4) $0.15Pb(Zn_{1/3}Nb_{2/3})O_3 + 0.425PbTiO_3 + 0.425PbZrO_3$ | J) $0.12Pb(Zn_{1/3}Nb_{2/3})O_3 + 0.38PbTiO_3 + 0.50PbZrO_3$ |

Experimental Examples 2 to 10

Plate-like polycrystalline particles according to Experimental Example 2 were manufactured in the same manner as Experimental Example 1, except that an additive component of 0.020 mol NiO substituted for the additive component of 0.002 mol MgO in the composition of the plate-like polycrystalline particles in Experimental Example 1 (0.2Pb(Mg$_{0.33}$Nb$_{0.67}$)O$_3$+0.35PbTiO$_3$+0.45PbZrO$_3$+0.002 mol MgO). Plate-like polycrystalline particles according to Experimental Example 3 were manufactured in the same manner as Experimental Example 1, except that 0.01 mol MgO and 0.02 mol NiO (0.030 mol in total) were used as additive components. Plate-like polycrystalline particles according to Experimental Example 4 were manufactured in the same manner as Experimental Example 1, except that 0.04 mol MgO and 0.02 mol NiO (0.060 mol in total) were used as additive components. Plate-like polycrystalline particles according to Experimental Example 5 were manufactured in the same manner as Experimental Example 1, except that 0.08 mol MgO and 0.02 mol NiO (0.100 mol in total) were used as additive components. Plate-like polycrystalline particles according to Experimental Example 6 were manufactured in the same manner as Experimental Example 1, except that 0.4 mol MgO and 0.02 mol NiO (0.420 mol in total) were used as additive components. Plate-like polycrystalline particles according to Experimental Example 7 were manufactured in the same manner as Experimental Example 1, except that 1 mol MgO and 0.02 mol NiO (1.020 mol in total) were used as additive components. Plate-like polycrystalline particles according to Experimental Example 8 were manufactured in the same manner as Experimental Example 1, except that 0 mol MgO and 0.06 mol NiO (0.060 mol in total) were used as additive components. Plate-like polycrystalline particles according to Experimental Example 9 were manufactured in the same manner as Experimental Example 1, except that 0 mol MgO, 0.02 mol NiO, and 0.04 mol ZnO (0.060 mol in total) were used as additive components. Plate-like polycrystalline particles according to Experimental Example 10 were manufactured in the same manner as Experimental Example 1, except that 0.08 mol MgO and 0.02 mol NiO (0.100 mol in total) were used as additive components and that firing was performed in the presence of 5 g of powder having a composition of 0.2Pb(Mg$_{0.33}$Nb$_{0.67}$)O$_3$+0.35PbTiO$_3$+0.45PbZrO$_3$ (also referred to as firing atmosphere B).

Experimental Examples 11 and 12

In the raw material preparation step, 0.2Pb(Mg$_{0.33}$Nb$_{0.67}$)O$_3$+0.35PbTiO$_3$+0.45PbZrO$_3$ (basic composition 1) and 0.02 mol NiO were blended to prepare a raw material. In the firing step, firing was performed in the presence of 20 g of powder having a composition of $0.2Pb(Mg_{0.33}Nb0.67)O_3+0.35PbTiO_3+0.45PbZrO_3$ containing 0.02 mol NiO (also referred to as firing atmosphere C). Except those, plate-like polycrystalline particles according to Experimental Example 11 was manufactured in the same manner as Experimental Example 1. Alternatively, in the raw material preparation step, $0.2Pb(Mg_{0.33}Nb_{0.67})O_3+0.35PbTiO_3+0.45PbZrO_3$ (basic composition 1), 0.08 mol MgO, and 0.02 mol NiO were blended to prepare a raw material. In the firing step, firing was performed in the presence of 20 g of powder having a composition of $0.2Pb(Mg_{0.33}Nb_{0.67})O_3+0.35PbTiO_3+0.45PbZrO_3$ containing 0.02 mol NiO and 0.08 mol MgO (firing atmosphere D). Except those, plate-like polycrystalline particles according to Experimental Example 12 was manufactured in the same manner as Experimental Example 1.

Experimental Examples 13 to 22

In a raw material preparation step, $0.2Pb(Mg_{0.33}Nb_{0.67})O_3+0.43PbTiO_3+0.37PbZrO_3$ (basic composition 2) and 0.002 mol NiO were blended to prepare a raw material. In a firing step, the raw material was fired in the presence of 20 g of powder having a composition of $0.12Pb(Mg_{0.33}Nb_{0.67})o3+0.43PbTiO_3+0.45PbZrO_3$ containing 0.02 mol NiO (firing atmosphere E). Except those, plate-like polycrystalline particles according to Experimental Example 13 were manufactured in the same manner as Experimental Example 1. Plate-like polycrystalline particles according to Experimental Example 14 were manufactured in the same manner as Experimental Example 13, except that 0.02 mol NiO (0.02 mol in total) was used as an additive component. Plate-like polycrystalline particles according to Experimental Example 15 were manufactured in the same manner as Experimental Example 13, except that 0.01 mol MgO and 0.02 mol NiO (0.030 mol in total) were used as additive components. Plate-like polycrystalline particles according to Experimental Example 16 were manufactured in the same manner as Experimental Example 13, except that 0.04 mol MgO and 0.02 mol NiO (0.060 mol in total) were used as additive components. Plate-like polycrystalline particles according to Experimental Example 17 were manufactured as in Experimental Example 13, except that 0.08 mol MgO and 0.02 mol NiO (0.100 mol in total) were used as additive components. Plate-like polycrystalline particles according to Experimental Example 18 were manufactured as in Experimental Example 13, except that 0.4 mol MgO and 0.02 mol NiO (0.42 mol in total) were used as additive components. Plate-like polycrystalline particles according to Experimental Example 19 were manufactured as in Experimental Example 13, except that 1 mol MgO and 0.02 mol NiO (1.020 mol in total) were used as additive components. Plate-like polycrystalline particles according to Experimental Example 20 were manufactured as in Experimental Example 13, except that 0 mol MgO and 0.06 mol NiO (0.060 mol in total) were used as additive components. Plate-like polycrystalline particles according to Experimental Example 21 were manufactured as in Experimental Example 13, except that 0 mol MgO, 0.02 mol NiO, and 0.04 mol ZnO (0.060 mol in total) were used as additive components. Plate-like polycrystalline particles according to Experimental Example 22 were manufactured in the same manner as Experimental Example 13, except that 0.08 mol MgO and 0.02 mol NiO (0.100 mol in total) were used as additive components and firing was performed in the presence of 5 g of powder having a composition of $0.2Pb(Mg_{0.33}Nb_{0.67})O_3+0.43PbTiO_3+0.37PbZrO_3$ (also referred to as firing atmosphere F).

Experimental Example 23 and 24

In the raw material preparation step, $0.2Pb(Mg_{0.33}Nb0.67)O_3+0.43PbTiO_3+0.37PbZrO_3$ (basic composition 2) and 0.02 mol NiO were blended to prepare a raw material. In the firing step, firing was performed in the presence of 20 g of powder having a composition of $0.2Pb(Mg_{0.33}Nb_{0.67})O_3+0.43PbTiO_3+0.37PbZrO_3$ containing 0.02 mol NiO (firing atmosphere G). Except those, a plate-like polycrystalline particle according to Experimental Example 23 was manufactured in the same manner as Experimental Example 1. Alternatively, in the raw material preparation step, $0.2Pb(Mg_{0.33}Nb_{0.67})O_3+0.43PbTiO_3+0.37PbZrO_3$ (basic composition 2), 0.08 mol MgO, and 0.02 mol NiO were blended to prepare a raw material. Alternatively, in the firing step, firing was performed in the presence of 20 g of powder having a composition of $0.2Pb(Mg_{0.33}Nb_{0.67})O_3+0.43PbTiO_3+0.37PbZrO_3$ containing 0.08 mol MgO and 0.02 mol NiO (firing atmosphere H). Except those, a plate-like polycrystalline particle according to Experimental Example 24 was manufactured in the same manner as Experimental Example 1.

Experimental Examples 25 to 27

In the raw material preparation step, $0.2Pb(Mg_{0.33}Nb_{0.67})O_3+0.43PbTiO_3+0.37PbZrO_3$ (basic composition 2) and 0.08 mol MgO were blended to prepare a raw material. In the firing step, firing was performed in the presence of 20 g of powder having a composition of $0.12Pb(Mg_{0.33}Nb_{0.67})O_3+0.43PbTiO_3+0.45PbZrO_3$ containing 0.02 mol NiO (firing atmosphere E). Except those, a plate-like polycrystalline particle according to Experimental Example 25 was manufactured in the same manner as Experimental Example 1. In the raw material preparation step, $0.25Pb(Ni_{0.33}Nb_{0.67})O_3+0.40PbTiO_3+0.35PbZrO_3$ (basic composition 3) and 0.06 mol NiO were blended to prepare a raw material. In the firing step, firing was performed in the presence of 20 g of powder having a composition of $0.18Pb(Ni_{0.33}Nb_{0.67})O_3+0.40PbTiO_3+0.42PbZrO_3$ (firing atmosphere I). Except those, a plate-like polycrystalline particle according to Experimental Example 26 was manufactured in the same manner as Experimental Example 1. Alternatively, in the raw material preparation step, $0.15Pb(Zn_{0.33}Nb_{0.67})O_3+0.425PbTiO_3+0.425PbZrO_3$ (basic composition 4) and 0.04 mol ZnO were blended to prepare a raw material. In the firing step, firing was performed in the presence of 20 g of powder having a composition of $0.12Pb(Zn_{0.33}Nb_{0.67})O_3+0.38PbTiO_3+0.50PbZrO_3$ (firing atmosphere J). Except those, a plate-like polycrystalline particle according to Experimental Example 27 was manufactured in the same manner as Experimental Example 1. The median diameter (D50) of inorganic particles in the raw material preparation step in Experimental Examples 2 to 27 described below were also about 0.4 μm.

X-ray Diffraction Measurement and Calculation of Degree of Orientation

The X-ray diffraction pattern of crystal faces of a fired shaped body (a plate-like polycrystalline particle) was measured for Experimental Examples 1 to 27 with an X-ray diffractometer (RINT TTRIII, manufactured by Rigaku Co.). From this X-ray diffraction pattern, the degree of orientation of the pseudo-cubic (100) plane was calculated according to Equation 2 by the Lotgering method using peaks of pseudo-cubic (100), (110), and (111).

Electron Photomicrography and Calculation of Curvature

Figure 5:
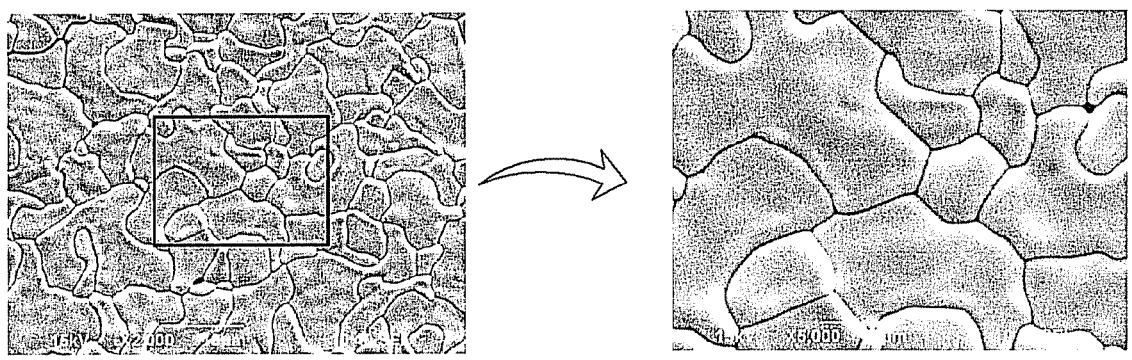
FIG. 5 is a scanning electron microscope (SEM) photograph of crystal grains prepared in Experimental Example 5.
Figure 6:
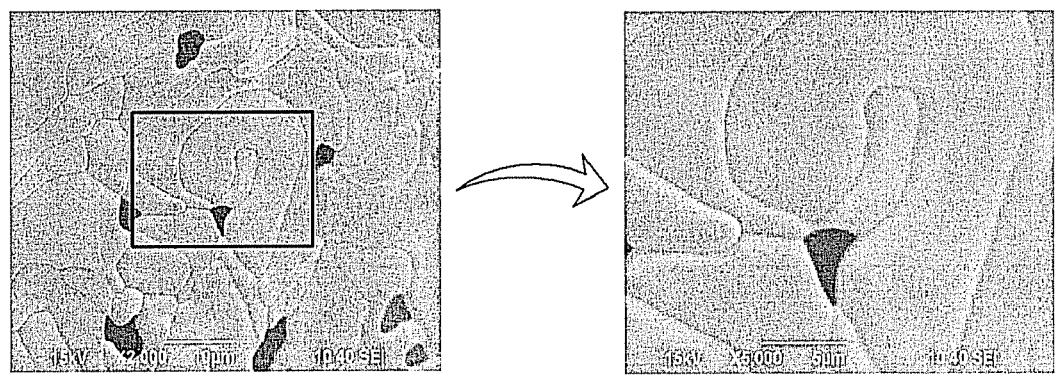
FIG. 6 is a SEM photograph of crystal grains prepared in Experimental Example 8.
Figure 7:
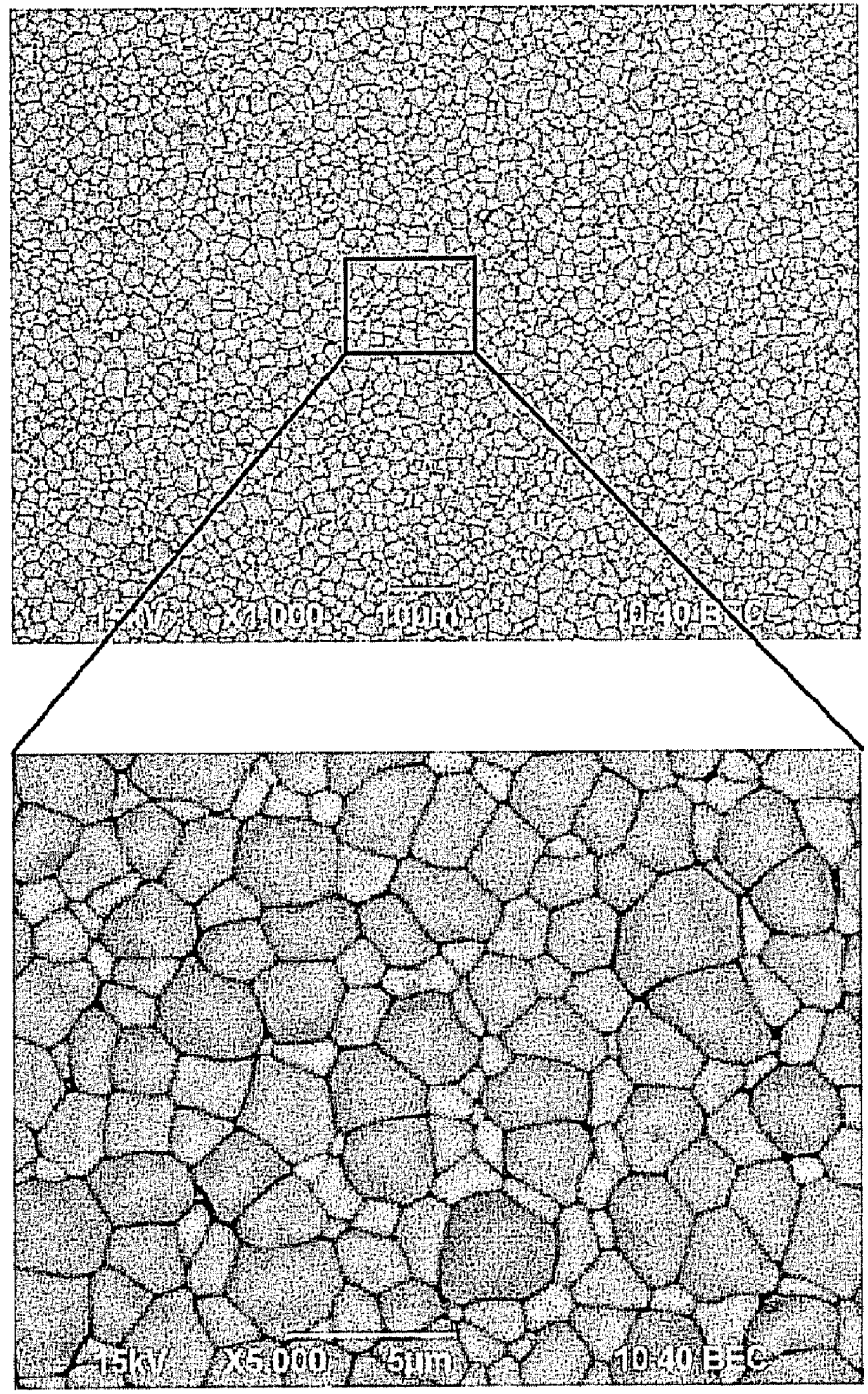
FIG. 7 is a SEM photograph of crystal grains prepared in Experimental Example 11.
Figure 8:
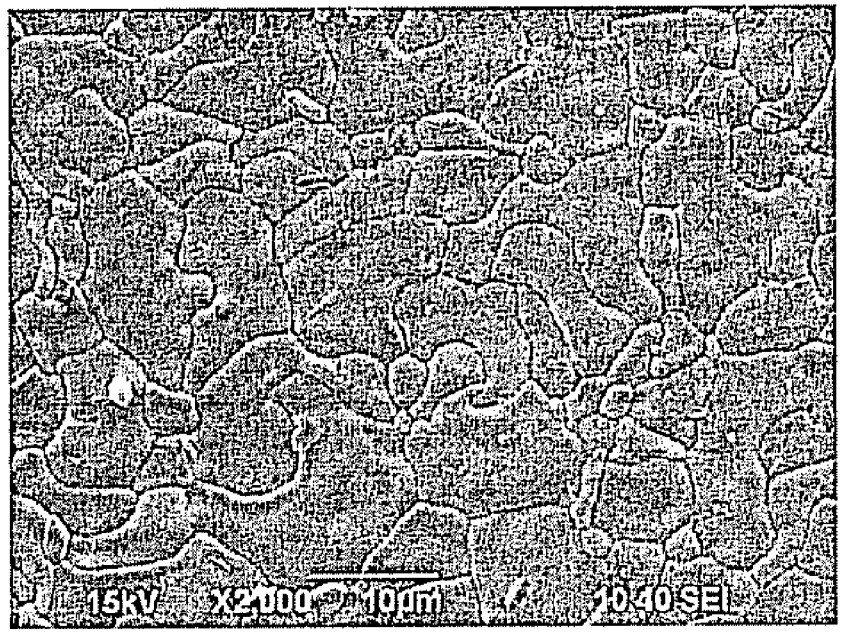
FIG. 8 shows SEM photographs of a fired shaped body before crashing and plate-like polycrystalline particles after crashing in Experimental Example 22.
Figure 8:
Figure 8:
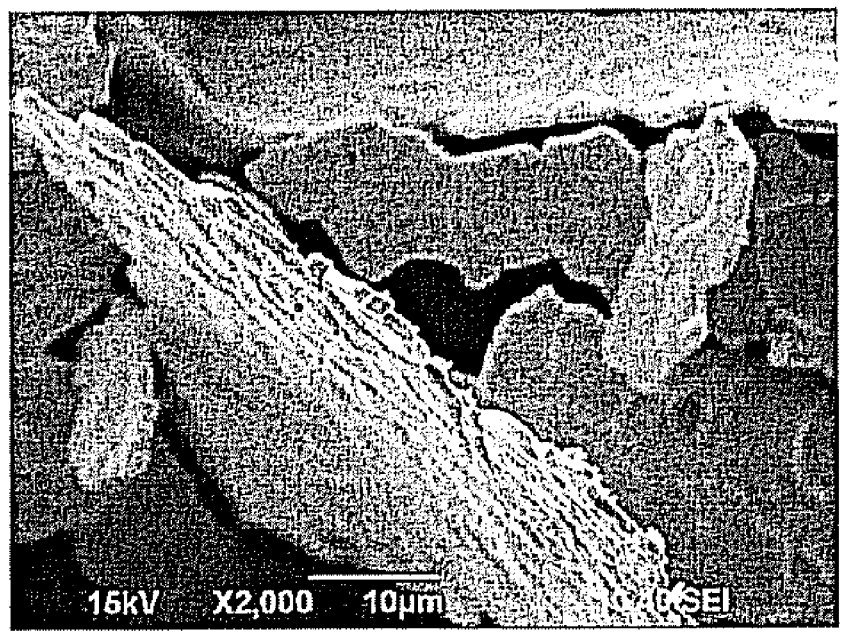

SEM photographs of Experimental Examples 1 to 27 were taken with a scanning electron microscope (JSM-6390, manufactured by JEOL Ltd.). FIG. 5 is a SEM photograph of fired crystal grains prepared in Experimental Example 5. FIG. 6 is a SEM photograph of fired crystal grains prepared in Experimental Example 8. FIG. 7 is a SEM photograph of fired crystal grains prepared in Experimental Example 11. FIG. 8 shows SEM photographs of fired crystal grains before crashing and plate-like polycrystalline particles after crashing in Experimental Example 22. The curvature was determined for Experimental Examples 1 to 27 from electron micrographs in the following manner. First, on the basis of a SEM photograph of crystal grains taken in a visual field that included 20 to 40 crystal grains, the maximum lengths of crystal faces of all the crystal grains that were entirely included in the visual field (i.e., excluding grain fragments cut at the edge of the visual field) were measured as the grain sizes. The grain sizes were averaged. Five grains having a size larger than the average grain size were arbitrarily selected. In the selected grains, a first straight line was drawn between two triple points of adjacent grain boundaries. A second straight line parallel to the first straight line and in contact with the grain boundary between the two triple points was drawn. The length of the perpendicular line from the contact point to the first straight line was measured. The ratio of the length of the perpendicular line to the length of the first straight line was calculated for all the grain boundaries of a selected grain. The maximum ratio was taken as the curvature of the crystal grain. The mean value of the curvatures of the five selected crystal grains was considered as the curvature of a plate-like polycrystalline particle.

Results of Measurements

Table 2 summarizes the basic composition, the type and amount of M component in Equation 1, the firing atmosphere, the curvature, and the degree of orientation as determined by the Lotgering method. In the firing atmospheres A, B, E, F, I, and J, a shaped body was fired in the presence of a coexisting material having a composition different from the composition of the shaped body (predetermined low volatilization condition). In the firing atmospheres C, D, G, and H, a shaped body was fired in the presence of a coexisting material having the same composition as the shaped body. As shown in FIGS. 5 to 8, in Experimental Examples 5 and 8, a plurality of crystal grains had a wavy structure composed of wavy grain boundaries in cross section. The wavy grain boundaries included concave portions and convex portions. The concave portions and the convex portions mated with convex portions and concave portions of adjacent crystal grains, respectively. The crystal grains formed a plate-like polycrystalline particle having a high aspect ratio. The plate-like polycrystalline particle in Experimental Example 5 had a degree of orientation as high as 73% as determined by the Lotgering method. The plate-like polycrystalline particle in Experimental Example 8 had a degree of orientation as high as 55%. In contrast, in Experimental Examples 11, 12, 23, and 24, firing in the presence of an excessive amount of M component (Mg, Ni, or Zn) and a coexisting material having the same composition as the shaped body did not produce a wavy structure or orientation. In Experimental Examples 1 to 6, Experimental Examples 8 to 10, Experimental Examples 13 to 18, and Experimental Examples 20 to 22, in which the coexisting material contained a smaller amount of $Pb(M_x,Nb_y)O_3$ and a larger amount of $PbZrO_3$ than those in the shaped body, the curvatures were relatively high, and the degrees of orientation were high. These results indicate that when the value z of M component is at least 0.002 and less than 1.020 and when the coexisting material appropriately volatilizes at a rate higher than the shaped body, firing in the presence of the coexisting material can produce a wavy structure and high orientation. Experimental Examples 25 to 27 show that similar results were obtained even when the M component was altered. Regarding crystal orientation, the results show that the present method of adding a component of a plate-like polycrystalline particle in an excessive amount to orient crystals is more effective than a method of adding a component other than the components of the plate-like polycrystalline particle to increase the degree of orientation. As illustrated in FIG. 8, a plate-like polycrystalline particle contained a plurality of crystal grains that had a wavy structure composed of wavy grain boundaries in cross section. The wavy grain boundaries included concave portions and convex portions. The concave portions and the convex portions mated with convex portions and concave portions of adjacent crystal grains, respectively. In a major part of the plate-like polycrystalline particle, the number of crystal grains in the thickness direction was one. It was therefore found that the plate-like polycrystalline particle was relatively easily divided at the grain boundaries. Thus, in Experimental Examples 1 to 6, Experimental Examples 8 to 10, Experimental Examples 13 to 18, and Experimental Examples 20 to 22, the aspect ratio or size of the plate-like polycrystalline particle can be easily altered by altering the mesh opening size.

TABLE 2

| | Basic Compositions[1] | M component (mol) | | | | Firing atmosphere[3] | Curvature[4] | Degree of Orientation[5] % |
|---|---|---|---|---|---|---|---|---|
| | | Mg | Ni | Zn | z[2] | | | |
| Experimental Example 1 | 1 | 0.002 | 0 | 0 | 0.002 | A | 0.1 | 20 |
| Experimental Example 2 | 1 | 0 | 0.02 | 0 | 0.020 | A | 0.3 | 33 |
| Experimental Example 3 | 1 | 0.01 | 0.02 | 0 | 0.030 | A | 0.3 | 38 |
| Experimental Example 4 | 1 | 0.04 | 0.02 | 0 | 0.060 | A | 0.5 | 60 |
| Experimental Example 5 | 1 | 0.08 | 0.02 | 0 | 0.100 | A | 0.8 | 80 |
| Experimental Example 6 | 1 | 0.4 | 0.02 | 0 | 0.420 | A | 0.3 | 30 |
| Experimental Example 7 | 1 | 1 | 0.02 | 0 | 1.020 | A | 0.0 | 10 |
| Experimental Example 8 | 1 | 0 | 0.06 | 0 | 0.060 | A | 0.4 | 60 |
| Experimental Example 9 | 1 | 0 | 0.02 | 0.04 | 0.060 | A | 0.5 | 65 |
| Experimental Example 10 | 1 | 0.08 | 0.02 | 0 | 0.100 | B | 0.9 | 85 |
| Experimental Example 11 | 1 | 0 | 0.02 | 0 | 0.020 | C | 0.0 | 2 |
| Experimental Example 12 | 1 | 0.08 | 0.02 | 0 | 0.100 | D | 0.0 | 9 |
| Experimental Example 13 | 2 | 0.002 | 0 | 0 | 0.002 | E | 0.1 | 18 |
| Experimental Example 14 | 2 | 0 | 0.02 | 0 | 0.020 | E | 0.3 | 32 |
| Experimental Example 15 | 2 | 0.01 | 0.02 | 0 | 0.030 | E | 0.3 | 37 |
| Experimental Example 16 | 2 | 0.04 | 0.02 | 0 | 0.060 | E | 0.6 | 62 |
| Experimental Example 17 | 2 | 0.08 | 0.02 | 0 | 0.100 | E | 0.9 | 83 |

TABLE 2-continued

|  | Basic Compositions[1] | M component (mol) | | | $z^{2)}$ | Firing atmosphere[3] | Curvature[4] | Degree of Orientation[5] % |
|---|---|---|---|---|---|---|---|---|
|  |  | Mg | Ni | Zn |  |  |  |  |
| Experimental Example 18 | 2 | 0.4 | 0.02 | 0 | 0.420 | E | 0.3 | 28 |
| Experimental Example 19 | 2 | 1 | 0.02 | 0 | 1.020 | E | 0.0 | 8 |
| Experimental Example 20 | 2 | 0 | 0.06 | 0 | 0.060 | E | 0.4 | 58 |
| Experimental Example 21 | 2 | 0 | 0.02 | 0.04 | 0.060 | E | 0.5 | 63 |
| Experimental Example 22 | 2 | 0.08 | 0.02 | 0 | 0.100 | F | 0.9 | 87 |
| Experimental Example 23 | 2 | 0 | 0.02 | 0 | 0.020 | G | 0.0 | 3 |
| Experimental Example 24 | 2 | 0.08 | 0.02 | 0 | 0.100 | H | 0.0 | 11 |
| Experimental Example 25 | 2 | 0.08 | 0 | 0 | 0.080 | E | 0.5 | 65 |
| Experimental Example 26 | 3 | 0 | 0.06 | 0 | 0.060 | I | 0.4 | 55 |
| Experimental Example 27 | 4 | 0 | 0 | 0.04 | 0.040 | J | 0.4 | 60 |

[1] See the basic compositions in Table 1
[2] z value in a × Pb($M_x$Nb$_y$)O$_3$ + b × PbTiO$_3$ + c × PbZrO$_3$ + z × MO
[3] See Compositions of coexisting materials in Table 1
[4] The ratio of the maximum length of a perpendicular line from a straight line between adjacent triple points of grain boundaries to a grain boundary between adjacent triple points to the length of the straight line The present application claims priority from Japanese Patent Application No. 2008-74427 filed on Mar. 21, 2008, Japanese Patent Application No. 2008-152099 filed on Jun. 10, 2008, and Japanese Patent Application No. 2008-303235 filed on Nov. 27, 2008, the contents of all of which including the specification, the drawings, and the claims disclosed therein are hereby fully incorporated by reference into this application.

What is claimed is:

1. A self-supporting flat polycrystalline particle comprising a plurality of crystal grains that, when viewed in cross-section taken along a plane perpendicular to the particle thickness, have a wavy structure composed of wavy grain boundaries, the wavy grain boundaries including arcuate concave portions and arcuate convex portions, the arcuate concave portions and the arcuate convex portions mating with arcuate convex portions and arcuate concave portions of adjacent crystal grains, respectively, wherein
every crystal grain in the particle has at least one wavy grain boundary,
the curvature of crystal grains, defined by the length of a first straight line between adjacent triple points of grain boundaries divided into the maximum length of a perpendicular line drawn from the first straight line to the grain boundary between the adjacent triple points, is at least 0.1,
the number of crystal grains in the thickness direction is substantially one,
the self-supporting flat polycrystalline particle has a degree of orientation of at least 15% as determined by the Lotgering method,
the grain boundaries of the crystal grains, when viewed in cross-section taken along a plane parallel to the particle thickness, are substantially straight, and
the self-supporting flat polycrystalline particle has a size that will pass through a mesh opening of 1.0 mm or less.

2. The self-supporting flat polycrystalline particle according to claim 1, wherein the self-supporting flat polycrystalline particle has an aspect ratio of at least two.

3. The self-supporting flat polycrystalline particle according to claim 1, wherein the self-supporting flat polycrystalline particle has a thickness of 15 μm or less.

4. The self-supporting flat polycrystalline particle according to claim 1, wherein the length of each of the crystal grains along the surface of the self-supporting flat polycrystalline particle is not less than the length of each of the crystal grains in the thickness direction.

5. The self-supporting flat polycrystalline particle according to claim 1, wherein the crystal grains contain an oxide having a general formula of ABO$_3$ as the main component, the A site containing Pb, the B site containing at least one element selected from Mg, Zn, Nb, Ni, Ti and Zr.

6. The self-supporting flat polycrystalline particle according to claim 5, wherein the self-supporting flat polycrystalline particle is produced through a forming step of forming inorganic particles into a freestanding shaped body, the inorganic particles containing as the main component an oxide that has a general formula of ABO$_3$ and satisfies the following Equation 1, wherein z is in the range of $0.002 \leq z \leq 0.42$, a firing step of firing the shaped body alone or in combination with an inert layer that does not substantially react with the shaped body, and a crushing step of passing the fired shaped body through openings having a predetermined size to crush and classify the fired shaped body:

$a \times Pb(M'_{1/3}, Nb_{2/3})O_3 + b \times PbTiO_3 + c \times PbZrO_3 + z \times M''O$
(wherein $a+b+c=1$, and M' denotes at least one element selected from Mg, Ni and Zn, and M'' denotes at least one element selected from Mg, Ni and Zn) (Equation 1).

* * * * *

UNITED STATES PATENT AND TRADEMARK OFFICE
CERTIFICATE OF CORRECTION

PATENT NO. : 8,367,205 B2  
APPLICATION NO. : 12/395749  
DATED : February 5, 2013  
INVENTOR(S) : Yukinobu Yura et al.

Page 1 of 1

It is certified that error appears in the above-identified patent and that said Letters Patent is hereby corrected as shown below:

In the Claims:

Column 22, line 21

(claim 2, line 2): Please change "sell-supporting" to -- self-supporting --

Signed and Sealed this  
Fourteenth Day of May, 2013

Teresa Stanek Rea  
*Acting Director of the United States Patent and Trademark Office*